United States Patent [19]
Kitai et al.

[11] 3,834,802
[45] Sept. 10, 1974

[54] SHUTTER BLADE OPERATION MECHANISM FOR FOCAL PLANE SHUTTER

[75] Inventors: Kiyoshi Kitai, Tokyo; Eiichi Onda, Saitama; Mitsuo Koyama; Shinji Nagaoka; Tadashi Nakagawa, all of Chiba, Japan

[73] Assignee: Seiko Koki Kabushiki Kaisha, Tokyo, Japan

[22] Filed: May 14, 1973

[21] Appl. No.: 359,876

[30] Foreign Application Priority Data
May 16, 1972 Japan............................ 47-56318

[52] U.S. Cl.............................. 354/246, 354/250
[51] Int. Cl.......................... G03b 9/36, G03b 9/44
[58] Field of Search ............... 95/53, 55, 58, 59, 60

[56] References Cited
UNITED STATES PATENTS
2,975,689  3/1961  Chatani................................. 95/55
3,580,156  5/1971  Loserics................................ 95/60
3,628,438  12/1971  Loserics............................... 95/59

Primary Examiner—Samuel S. Matthews
Assistant Examiner—Russell E. Adams, Jr.
Attorney, Agent, or Firm—Robert E. Burns; Emmanuel J. Lobato; Bruce L. Adams

[57] ABSTRACT

A focal plane shutter having a set or group of shutter-opening shutter blades and a set or group of shutter-closing shutter blades each consisting of a plurality of shutter blades for opening a shutter exposure aperture and closing it. Driving mechanism is provided for each group with a driving main lever supported on one side of the exposure aperture. A shutter blade operating auxiliary lever is supported on a corresponding one of the driving main levers and one end of this auxiliary lever is rotatably connected with a slit-forming shutter blade and a slot guides the travel of this end of the auxiliary lever to operate the slit-forming blade in parallel motion to define a uniform rectangular slit as the aperture is opened and closed.

5 Claims, 5 Drawing Figures

SHUTTER BLADE OPERATION MECHANISM FOR FOCAL PLANE SHUTTER

BACKGROUND OF THE INVENTION

The present invention relates generally to focal plane shutters for cameras and more particularly to improvements in shutter blade operation devices for such shutters.

The use of shutter blades divided into two groups to reduce the size of focal plane shutters and the inertia thereof is known. Moreover, it is known to use in each group a slit-forming shutter blade which is moved parallel to a boundary of the shutter aperture with parallel motion applied thereto to develop an accurate slit as the shutter is opened or closed. The shutter blades are driven by driving main levers and auxiliary levers. Usually the operation mechanism has an overall size larger than necessary because the driving main levers for opening and closing the shutter blades are relatively long. The relationship between the main lever and the auxiliary lever generally results in a relatively extended lever arm. Thus the shutter opening and shutting mechanism has been a problem with respect to reducing the size of focal plane shutters and making them more compact.

SUMMARY OF THE INVENTION

It is a principal object of the present invention to provide a focal plane shutter operating mechanism that is compact.

It is another object of the present invention to provide a shutter blade operation mechanism which eliminates the use of long opening and closing main levers and auxiliary levers.

The focal plane shutter according to the invention comprises two groups of shutter blades, for opening and closing the shutter aperture, mounted independently and operated independently of each other. The shutter blade operation mechanism is made compact by the use of the main driving lever which has an auxiliary lever supported on the driving lever and an end thereof pivotally connected with a slit-forming shutter blade provided with a slot for being guided by the end of the auxiliary lever to effect parallel motion of the slit-forming blade.

The movements of the principal levers are guided by slots in a shutter baseboard. The auxiliary levers are likewise guided by guide slots in another baseboard and the slit-forming blades are guided by slots in the first-mentioned baseboard in conjunction with the guide slot thereof coactive with a corresponding auxiliary lever.

BRIEF DESCRIPTION OF THE DRAWINGS

Other features and advantages of the focal plane shutter in accordance with the present invention will be better understood as described in the following specification and appended claims, in conjunction with the following drawings in which:

DESCRIPTION OF THE PREFERRED EMBODIMENTS

Figure 1:
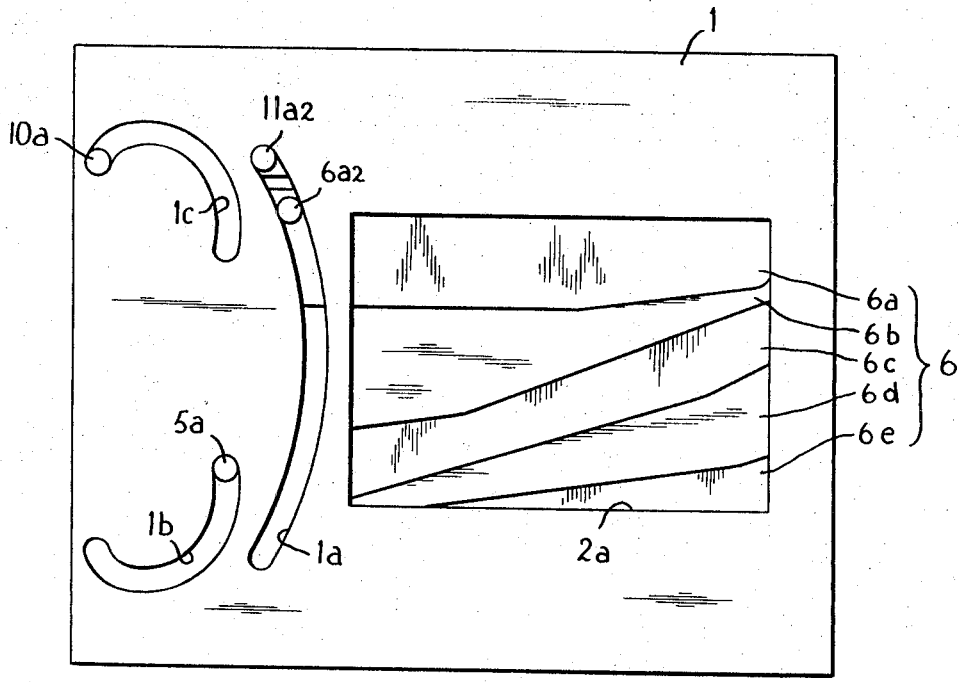
FIG. 1 is a front elevation view of a shutter according to the invention.

As shown in the drawings a focal plane shutter embodying the invention comprises a first or front baseboard which has a rectangular configuration and has a rectangular shutter aperture $2a$ thereon somewhat offset from the center. A second or back baseboard 3 of similar configuration is disposed opposed to the first baseboard and spaced therefrom. It likewise has a shutter aperture or opening $2b$ in registry with the shutter opening $2a$ of the front baseboard. The front and back baseboards substantially enclose the shutter blades and the operating mechanism therefor. The two baseboards are held spaced from each other by spacers, not shown.

On the front baseboard 1 an arcuate slot $1a$ is provided which is concave in a direction away from the exposure aperture and two substantially J-shaped slots $1c$, $1b$ which are disposed between the long arcuate slot $1a$ and the edge of the baseboard. All of the slots are disposed on the same side of the shutter aperture $2a$ as illustrated in FIG. 1. The back baseboard 3 is provided with two arcuate slots $3a$, $3b$ which have a concave side facing away from the exposure aperture $2b$.

Within the space between the two baseboards is mounted a shutter-opening main lever 4 pivotally driven by a pivot $4a$ and provided with a pin $4b$ which extends into the guide slot $3a$ on the back baseboard 3. The operating lever 4 operates an auxiliary lever 5 and a plurality or group of shutter-opening shutter blades 6. This blade group comprises a slit-forming shutter blade $6a$ of a generally rectangular configuration and having a trailing straight edge $6a_1$. A second shutter blade $6b$ has a substantially L-shape and has a guide slot $6b_1$ in the base. A third, fourth and fifth shutter-opening shutter blades $6c$, $6e$ are provided and have wide bases on which are disposed arcuate guide slots $6c_1$–$6e_1$. The blades are arranged in a superposed position.

The supporting structure for the shutter-opening blade group 6 comprises the driving pin $4b$ fixed on the opening driving lever. This pin extends axially through the arcuate slot $3a$ on the back baseboard 3 and the arcuate guide slots $6e_1$, $6d_1$ and $6c_1$ of the corresponding third, fourth and fifth shutter-opening blades $6e$, $6d$ and $6c$ and pivotal in the base of the second shutter blade $6b$ and the middle part of the suitably curved auxiliary lever 5. A pin 7 fxed on the baseboard 3 extends into the guide slot $6b_1$ of the second shutter blade $6b$. This pin 7 functions as a stop for the three shutter blades $6c$, $6d$ and $6e$ other than the slit-forming shutter blade $6a$ and the second shutter blade $6b$. Three of the shutter-opening blades $6c$, $6d$ and $6e$ have a base pivotally supported on the baseboard by a pin 8. The radii of curvature of the guide grooves or slots $6c_1$, $6d_1$ and $6e_1$ is larger than the radius of rotation of the driving pin $4b$. Shutter-opening blades $6c$, $6d$ and $6e$ are so arranged as to pivot the one after another as the driving pin $4b$ is actuated.

The two arm lever 5 has a pin $5a$ fixed on one of its ends extending into the J-shaped guide slot $1b$ in the front baseboard 1. The base part of the slit-forming shutter blade 6a is pivotally connected with the other end of the arm pin 5b. In addition a pin $6a_2$ is fixed on the base of the slit-forming blade 6a and extends into and is slidable within the arcuate guide groove 1a formed on the front baseboard 1. The two J-shaped slots 1b are so shaped that when the driving pin 4b is actuated about the axis of the pin 4a it guides movement of the slit-forming shutter blades 6 with its trailing edge $6a_1$ constantly held normal to a plane transverse to the shutter aperture so that an accurate slit is progressively formed as the shutter is opened.

Figure 4:
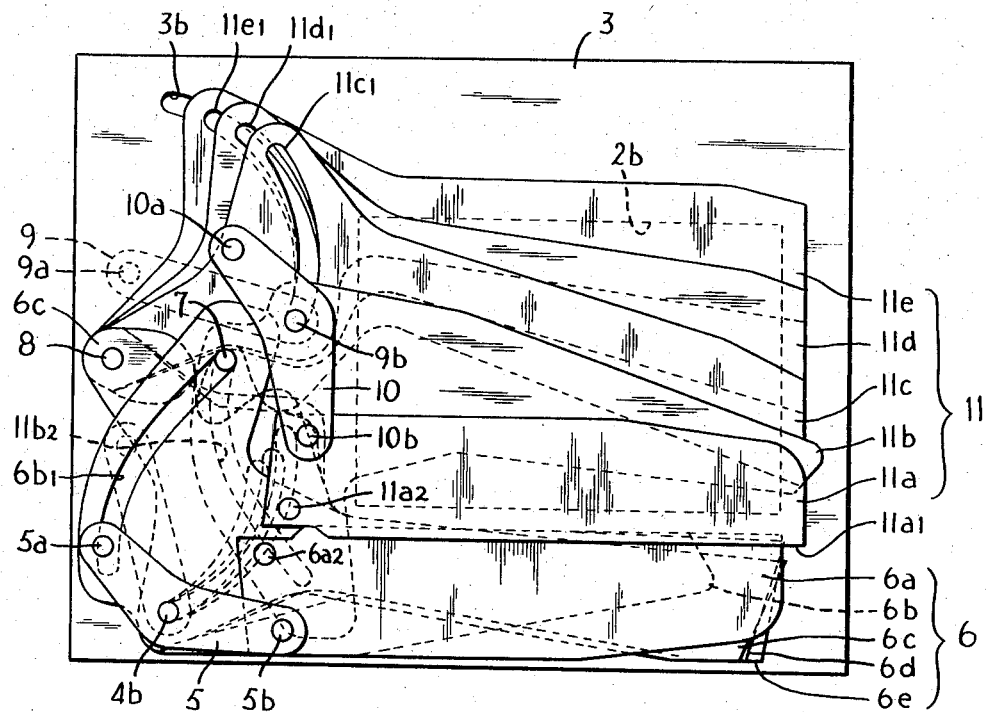
FIG. 4 is a front elevation view of the shutter shown in FIG. 2 illustrating the shutter blades closed after taking of a photographic exposure.

The shutter-closing group 11 comprises a plurality of shutter blades as illustrated in FIG. 4. The group comprises a slit-forming shutter blade 11a having a leading straight edge $11a_1$ and is generally rectangular in configuration. This blade and the other blades of the group are constructed similarly to the blades of the shutter-opening blade group except that they are of opposite hand construction and configuration. As will be explained hereinafter the movement of the shutter blades of this group is opposite hand to the movement of the shutter blades of the shutter-opening group of shutter blade. A second shutter-closing shutter blade 11b has a wide base having a guide groove $11b_1$ and third, fourth and fifth shutter blades 11, 11d and 11e have on their bases guide grooves $11c_1$, $11d_1$ and $11e_1$ respectively. In a rest position these shutter blades are situated above the shutter opening 2b and close the shutter by moving in the same direction in which the shutter-opening groups blades move in opening the shutter.

The support of these blades consist of the driving pin 9e which extends axially into the guide slot 3b; a pin 10a on the auxiliary lever 10 and which extends into the J-shaped guide slot 1c. A pin $11a_2$ on the slit-forming shutter blade 11a extends into the slot 1a of the front baseboard 1. The fixed pin 8 pivotally supports three of the shutter-closing shutter blades 11c, 11d and 11e. Thus the support structure is essentially the same as the support structure for the shutter-opening blade group.

OPERATION

Figure 2:
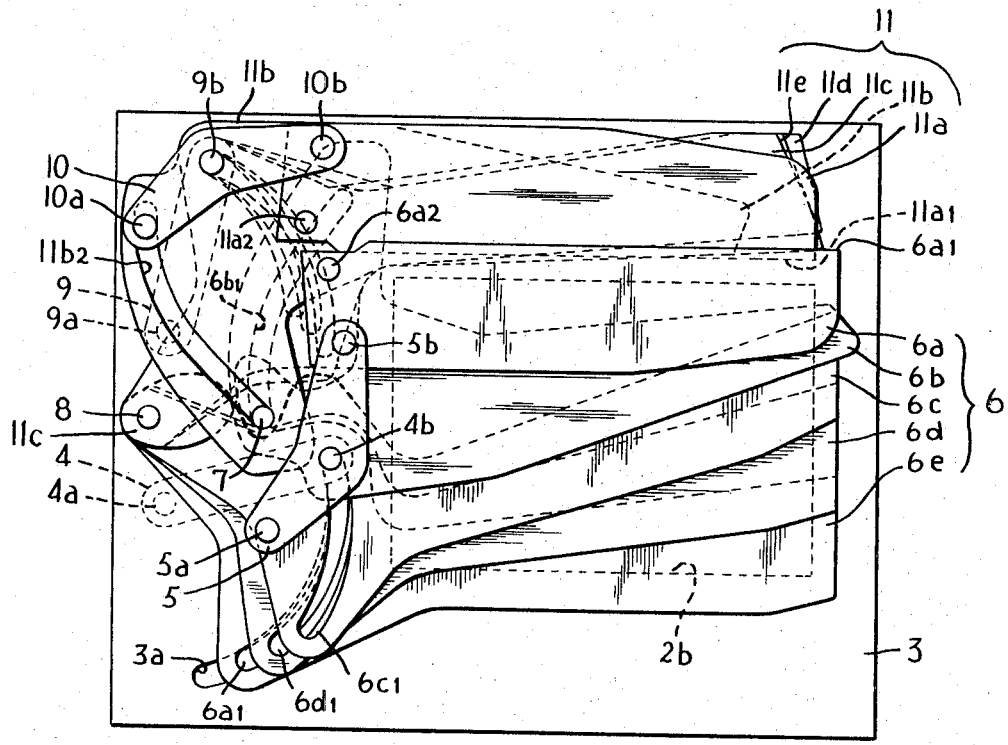
FIG. 2 is a front elevation view internally of the shutter in FIG. 1.
Figure 3:
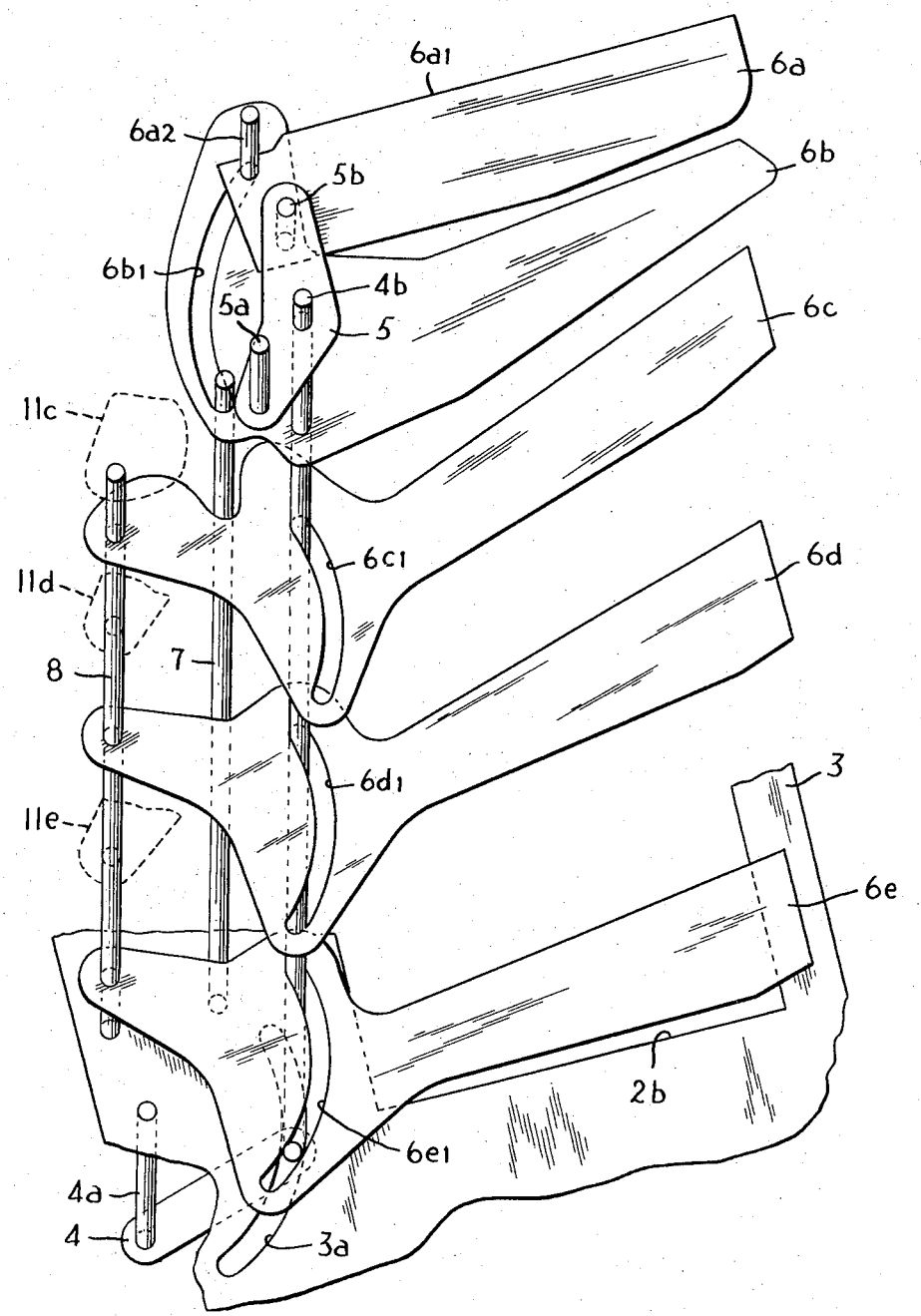
FIG. 3 is an exploded view of the shutter-opening shutter blade group and associated operating mechanism of the shutter in FIG. 1.

As indicated heretofore the shutter is illustrated in FIG. 1 in a cocked condition. When the camera shutter release mechanism or release lever, not shown, is operated the shutter-opening driving lever 4 is actuated, for example, by rotating its pivot in a clockwise direction and its driving pin 4b is carried along therewith simultaneously it operates the shutter-opening blade group 6 in a sequence in which the shutter blades are actuated sequentially. In this case the auxiliary lever 5 rotates toward the lower end of FIG. 2, as seen in the drawing, and its pin 5a is guided by the J-shaped guide slot 1b and actuates the slit-forming blade 6a with its upstanding pin 5b. The slit-forming blade 6a is kept so that its straight edge moves parallel to the major boundary of the shutter. Its pin $6a_2$ is guided by the guide slot 1a of the baseboard 1 without itself rotating. The first shutter blade 6b is actuated by the driving pin 4b and moves downwardly and is guided by its guide slot $6_1$ guided by the pin 7. The other three shutter-closing shutter blades 6c, 6b and 6e are driven clockwise direction as the driving pin 4b slides along their guide slots $6b_1$, $6d_2$ and $6e_1$ and pushes or actuates these shutter blades upon reaching the end of these guide slots. When the shutter-closing operation is completed the shutter-opening blade group 6 has "opened" the two exposure openings 2a and 2b.

After an exposure has been completed the time control mechanism for controlling the shutter is automatically activated. The shutter-closing driving lever 9 is actuated clockwise. The driving pin or rod 9b is actuated clockwise to operate the closing blade group 11. Their operation is essentially the same as that of the shutter-opening blade group except in opposite hand. Upon completion of the closing of shutter the shutter is in the condition illustrated in FIG. 4.

SECOND EMBODIMENT

Figure 5:
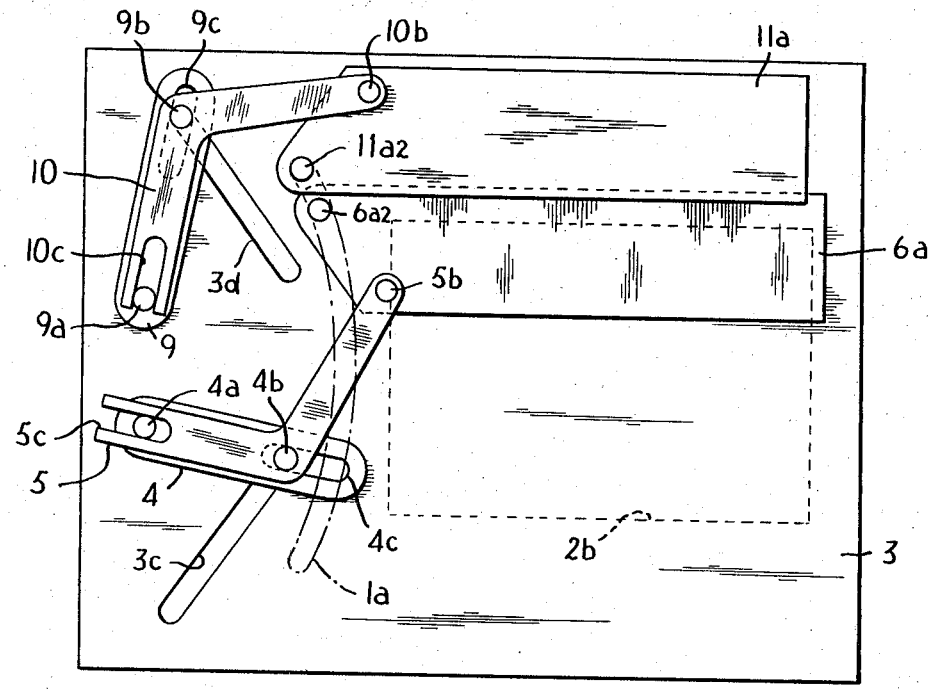
FIG. 5 is a front elevation view of a second embodiment of a focal plane shutter mechanism according to the invention.

A second embodiment of a shutter operating mechanism according to the invention is illustrated in FIG. 5. In this instance the reference numerals designating the various parts correspond to similar parts in the first-described embodiment in order for ease of understanding of the invention. The shutter blades in both groups are omitted except for the slit-forming shutter blades in order to simplify the drawing.

In this instance a shutter-opening main lever 4 and a shutter-closing main lever 9 are provided with guide pins 4a, 9a respectively which guide auxiliary levers 5, 10 for axial travel on the respective main levers. The auxiliary levers arms are provided with end notches 5c, 10c in which the guide pins 4a, 9a are received and are themselves provided with pins 4b, 9d in axial guide slots 4c, 9c of the main levers. The auxiliary arms levers are two-arm levers and are constructed as opposite hand configurations having at each free end pins 5b, 10b for holding or supporting slit-forming shutter blade 6a, 11a. Each of the shutter-closing slit-forming shutter blades is provided with a pin $6a_2$, $11a_2$ received in an arcuate guide slot 1a in a back baseboard 3. The backboard is provided with rectilinear guide slots 3c, 3d in which are received the pins 4b, 9b guiding the travel of the auxiliary levers relative to the baseboard while guided during axial travel on the corresponding main levers.

Those skilled in the art will recognize that the rectilinear slots 3c, 3d guiding the travel of the levers, in conjunction with the arcuate slot 1a, guiding the slit-forming shutter blades, will cause movement of the individual slit-forming blades paralllel with the long or upper border or boundary of the exposure aperture and normal to a plane passing transversely of the exposure aperture. The other shutter blades of each group are the same as those described heretofore and slots 1b and 7c are eliminated.

Moreover, some of those skilled in the art will readily understand that the shutter operating mechanism according to the invention is simply constructed and eliminates the use of long driving main levers and auxiliary levers of the usual type. Accordingly the focal plane shutter according to the invention may be made very compactly and of minimum inertia.

What we claim and desire to secure by Letters Patent is:

1. On a focal plane shutter, a first group or shutter-opening shutter blades, a second group of shutter-closing shutter blades, means defining a shutter aperture, a pair of paired levers for actuating the first and second group of shutter blades independently to operative positions for opening and closing the shutter aperture, each pair of paired levers comprising a main pivotally driven lever and an auxiliary lever mounted on the corresponding main lever, baseboard means supporting said levers and said first group and said second group of shutter blades, said baseboard means having for each auxiliary lever two guide slots for guiding travel of a corresponding auxiliary lever during actuation of the corresponding main lever, means for each auxiliary lever connecting it to a corresponding one of said shutter blades of a corresponding group for actuating it to move said one shutter blade of a corresponding group to define a rectangular slit when the shutter aperture is being opened and closed, said one blade constituting a slit-forming shutter blade, means for each auxiliary lever cooperative with said guide slots for guiding movement of the auxiliary levers for actuating said slit-forming blade of a corresponding group for defining said rectangular slit, and means for each shutter group connecting the shutter blades to a corresponding main lever for actuation thereof by a corresponding main lever.

2. On a focal plane shutter according to claim 1 in which said two guide slots have an arcuate configuration and both are configured to effect jointly guided travel of said slit-forming shutter blade of each group parallel to a side boundary of said shutter aperture, said side boundary being striaght, and each said slit-forming shutter blade having a straight edge moved parallel to said side boundary.

3. On a focal plane shutter according to claim 2, in which both said guide slots are J-shaped.

4. On a focal plane shutter according to claim 2, in which said guide slots are rectilinear.

5. On a focal plane shutter according to claim 1, in which said each main lever comprises a guide slot axially thereof, means mounting the corresponding auxiliary lever for axial travel thereon axially of the main lever, and said auxiliary lever having an arm extending away from the corresponding main lever.

* * * * *